United States Patent [19]

Khalid et al.

[11] Patent Number: 5,063,408
[45] Date of Patent: Nov. 5, 1991

[54] MOTORIZED SHEET FILM CARTRIDGE

[75] Inventors: Najeeb A. Khalid, Montreal; Larry Adams, Dorval; Stan Schwartz; Jean Wong, both of Montreal, all of Canada

[73] Assignee: Escher-Grad Incorporated, Montreal, Canada

[21] Appl. No.: 673,333

[22] Filed: Mar. 22, 1991

[51] Int. Cl.⁵ .............................................. G03B 27/58
[52] U.S. Cl. ..................................... 355/72; 355/133; 378/182
[58] Field of Search ................................ 355/72, 133; 354/275-277; 378/182; 206/455

[56] References Cited

U.S. PATENT DOCUMENTS

| | | | |
|---|---|---|---|
| 3,955,092 | 5/1976 | Hubert | 250/468 |
| 4,281,915 | 4/1981 | Kröbel | 354/275 |
| 4,727,391 | 2/1988 | Tajima et al. | 354/277 |
| 4,799,591 | 1/1989 | Tajima et al. | 206/455 |

Primary Examiner—L. T. Hix
Assistant Examiner—D. Rutledge
Attorney, Agent, or Firm—Foley & Lardner

[57] ABSTRACT

A motorized sheet film cartridge comprises a light proof housing which defines an opening in its top wall. A refillable tray containing stacked sheet films is slidable in the housing. The housing includes a slidable door which displaces in a longitudinal direction horizontally over the tray and its content of sheet films between open and closed positions thereof. In its closed position, the door closes the housing opening, whereas in its open position, sheet films contained in the housing can be removed therefrom through the opening. The door is operated by a reversible DC motor which drives a pair of endless chains provided on each longitudinal side of the door for displacing the door between its open and closed positions. The motor is actuated by an external computer to appropriately open or close the door. The computer also verifies that the door is closed except when film is being loaded in the cartridge or unloaded therefrom through the opening. The cartridge is removable and portable. The tray is lockable in its retracted position in the housing. Labels are provided on the cartridge to indicate if it contains exposed or unexposed films.

18 Claims, 3 Drawing Sheets

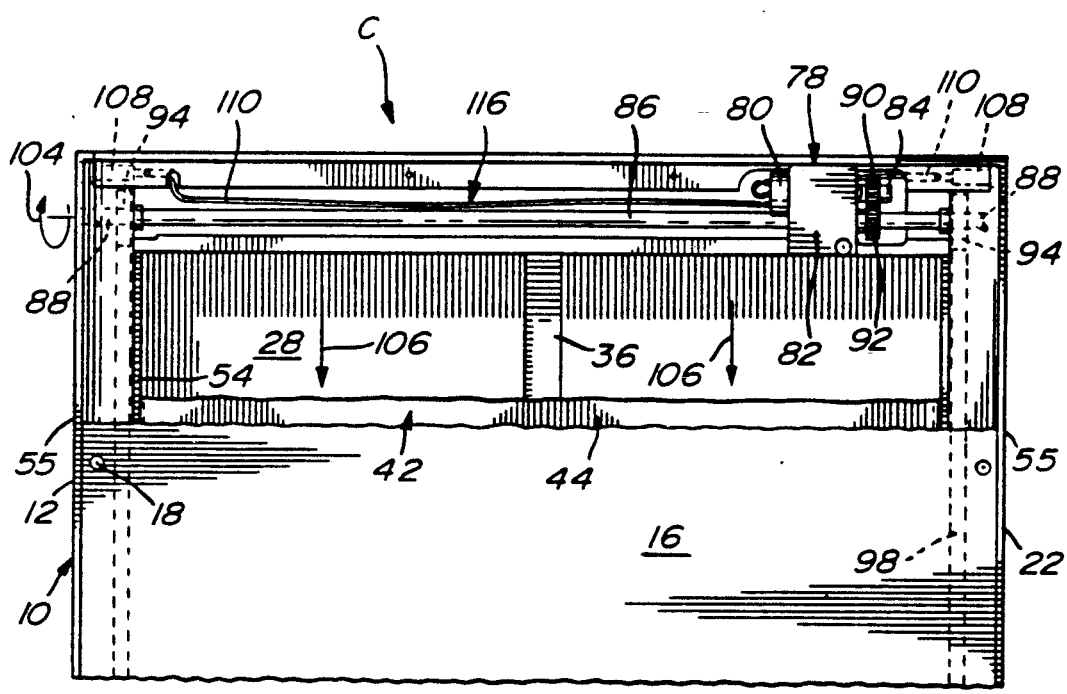
Fig. 2
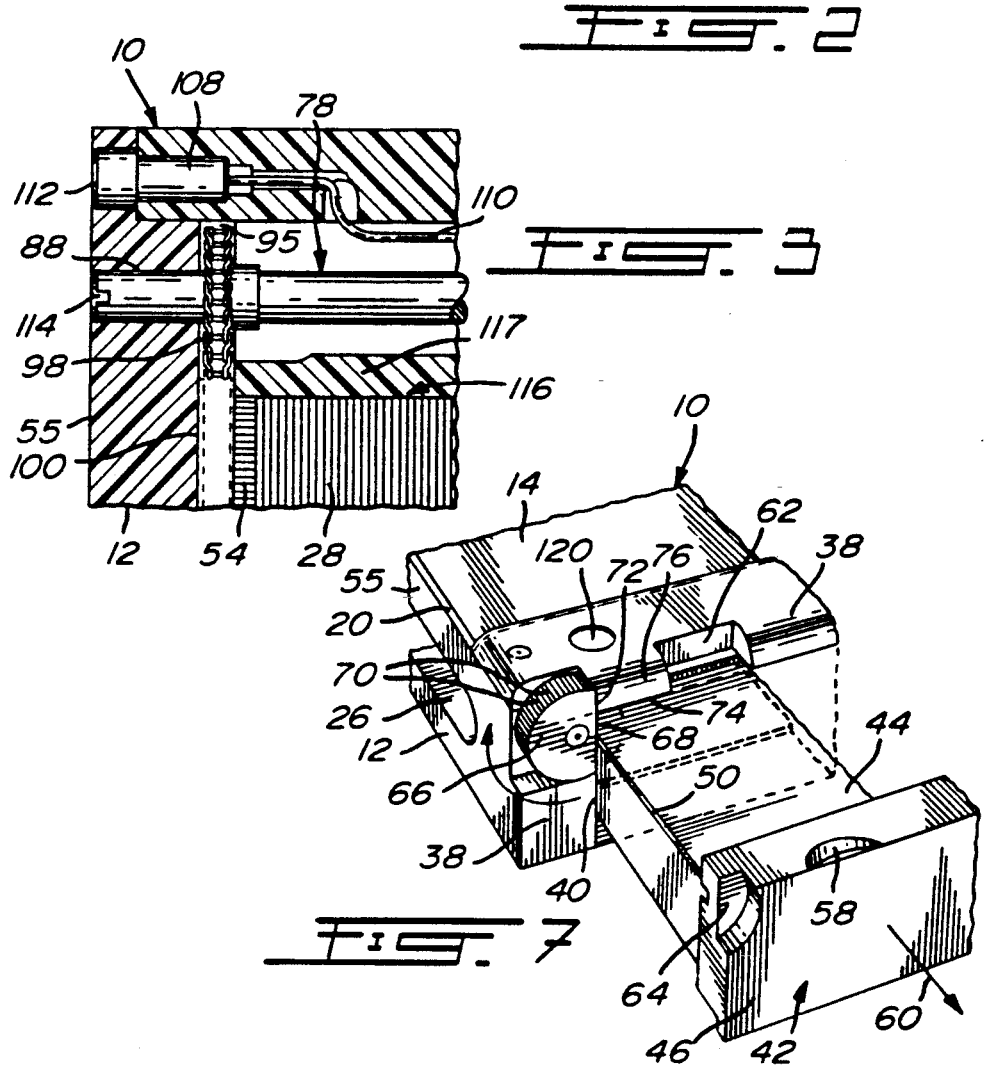
Fig. 3
Fig. 7

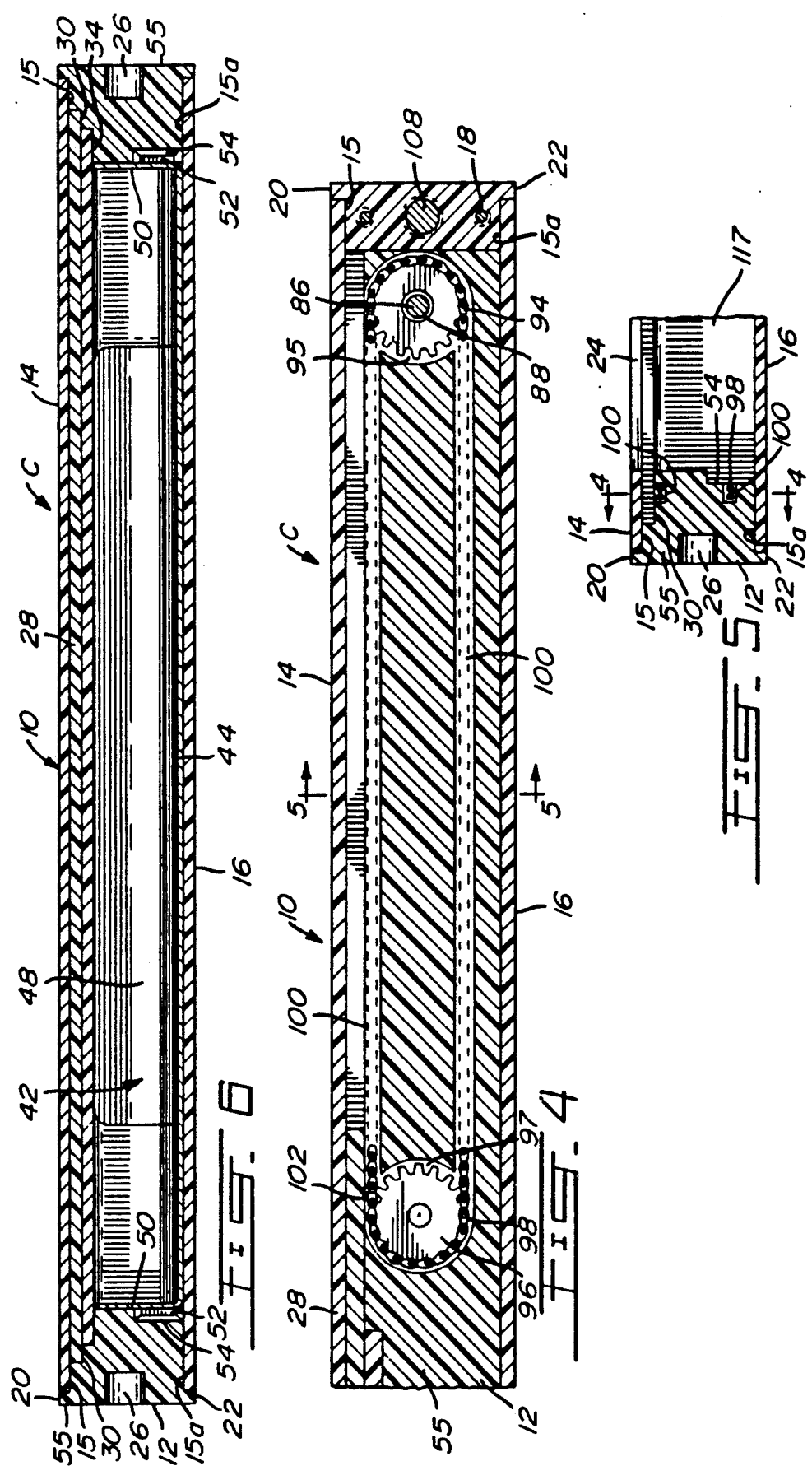

MOTORIZED SHEET FILM CARTRIDGE

BACKGROUND OF THE INVENTION

The present invention relates to improvements in the field of laser imaging. More particularly, the invention is concerned with a sheet film cartridge for use in laser imaging having a motorized door which can be automatically operated by a computer.

Laser imaging apparatuses are well known in the art. These apparatuses are capable of producing on a photosensitive material two-dimensional images having resolutions of up to 8,000 dots per inch. One type of such apparatuses generally includes a laser scanning system for scanning a laser beam across a sheet film which is moved by a film transport mechanism. The laser scanning system typically comprises a laser source for generating a laser beam containing input information, a scan lens and a rotating mirror for reflecting the laser beam through the scan lens to produce a scanning beam with a constant linear velocity. The scan lens acts on the scanning beam to provide a focused beam spot that moves in a linear direction across the film, thereby providing a first dimension of the two-dimensional image on the film. Concurrently or alternately with the movement of the scanning beam, the film transport mechanism moves the film either continuously or in discrete steps to provide the other dimension of the desired two-dimensional image.

Laser imaging apparatuses of the above type require constant attention. Each sheet of film must be placed manually in the apparatus and removed by hand after each exposure. The exposed film is then brought to a film processor where, once again, it is fed manually. Both steps require a trained operator and a darkroom. For these reasons, laser imaging has been expensive and inconvenient. Apart from service bureaus only large corporations have had the resources to maintain an in-house laser imaging apparatus.

Sheet film packages and devices for loading sheet films into an image recording apparatus have already been proposed. For example, U.S. Pat. No. 4,799,591, issued on Jan. 24, 1989 to Tajima et al, describes a sheet film package comprising a tray for storing a stack of sheet films and a flexible cover member peelably attached to the tray in covering relation to a film access opening in the tray for shielding the sheet films in the tray from extraneous light. By inserting the cover member into a cover member peeling passage defined in the image recording apparatus, the cover member is peeled off the tray to open the film access opening. The films are then removed one by one from the tray and delivered to the recording section of the apparatus. However, once the cover member has been peeled off the tray, there is no protection of the unexposed films in the tray against low level repeated exposure to the radiation used in the apparatus for exposing the film removed from the tray. Moreover, the tray cannot be reused for unloading exposed films from the image recording apparatus.

SUMMARY OF THE INVENTION

It is therefore an object of the present invention to overcome the above drawbacks and to provide a sheet film cartridge for not only loading sheet films into a laser imaging apparatus or the like, but also for unloading exposed films therefrom.

It is another object of the present invention to provide a sheet film cartridge in which the unexposed films are protected against low level repeated exposure to the radiation used in the apparatus for exposing the film removed from the cartridge.

It is also an object of the present invention to provide a sheet film cartridge having a motorized sliding door.

It is a further object of the present invention to provide a sheet film cartridge wherein the motorized sliding door can be automatically operated by an external computer means.

A construction in accordance with the present invention comprises a motorized sheet film cartridge comprising a housing means for containing at least one sheet film with the housing means defining an opening. The cartridge also comprises a film access door means and a door drive means for displacing the door means between an open position in which the sheet film can be removed from the housing means or inserted therein through the opening and a closed position in which the door means closes the opening. The door drive means is adapted to be actuated by an external control means for selectively opening or closing the door means.

In a more specific construction, a refillable magazine means is provided for containing a stack of sheet films. The door means is horizontally slidable between a top wall of the housing means and the magazine means. Locking means may be provided for securing the magazine means to the housing means in a retracted position thereof.

In another specific construction, the door drive means comprises a reversible motor means mounted in the housing means for rotatably driving a door operating shaft journaled in the housing means. Door drive gear means are mounted to the door operating shaft and are adapted for driving at least one push-pull elongated member. A connection means is provided between the door means and the elongated member with the latter being adapted to displace the connection means horizontally in the direction of travel of the door means on a distance at least as great as this travel.

In a still more specific construction, the push-pull elongated member comprises an endless chain with the connection means comprising a pin which extends downwards from the door means and engages a link of the chain.

In another specific construction, one chain is provided on each of the two longitudinal sides of the door means with one pin engaging each chain.

In another specific construction, the motor means comprises electrical contact means adapted to be electrically connected to the external control means for transmitting control signals emitted thereby to the motor means. The motor means is adapted to be actuated in accordance with the control means for driving the door means in an appropriate direction. Preferably, the motor means comprises a DC motor.

In still another specific construction, the external control means includes a computer means. The door means is provided with a door indicating means for allowing the computer means to sense a position of the door means to ensure that the door means is in the closed position thereof except for when a sheet film is being unloaded from or loaded in the cartridge. More particularly, the door position indicating means comprises reflector means disposed on an upper surface of the door means with external means connected to the computer means emitting infrared light towards the reflector means for determining the position of the door means.

In yet another specific construction, the cartridge is of lightproof modular construction and is portable. The housing means and the magazine means may each comprise a cartridge status indicator means for indicating if the cartridge contains exposed or unexposed sheet films.

The various motorized sheet film cartridges in accordance with the present invention may be used, as indicated hereinabove, in laser imaging apparatuses. On the other hand, the cartridges of the present invention car also be used in other applications, such as in X-ray photographing devices.

BRIEF DESCRIPTION OF THE DRAWINGS

Having thus generally described the nature of the invention, reference will now be made to the accompanying drawings, showing by way of illustration a preferred embodiment thereof, and in which:

FIG. 2 is a fragmented bottom plan view of the motorized sheet film cartridge of FIG. 1 without its tray;

FIG. 3 is an enlarged bottom plan cross-section of a part of the motorized sheet film cartridge of FIG. 1 without its tray;

FIG. 4 is a longitudinal vertical cross-section taken along lines 4—4 of FIG. 5 of part of the motorized sheet film cartridge with its door being open;

FIG. 5 is a transverse vertical cross-section taken along lines 5—5 of FIG. 4 of part of the motorized sheet film cartridge with its door being open;

FIG. 6 is a transverse vertical cross-section taken along lines 6—6 of FIG. 1 of the motorized sheet film-cartridge;

FIG. 7 is an enlarged perspective view of a front part of the motorized sheet film cartridge of FIG. 1 with its tray being partly extracted therefrom.

FIGS. 1 to 7 illustrate a motorized sheet film cartridge C in accordance with the present invention.

DESCRIPTION OF PREFERRED EMBODIMENTS

Figure 1:
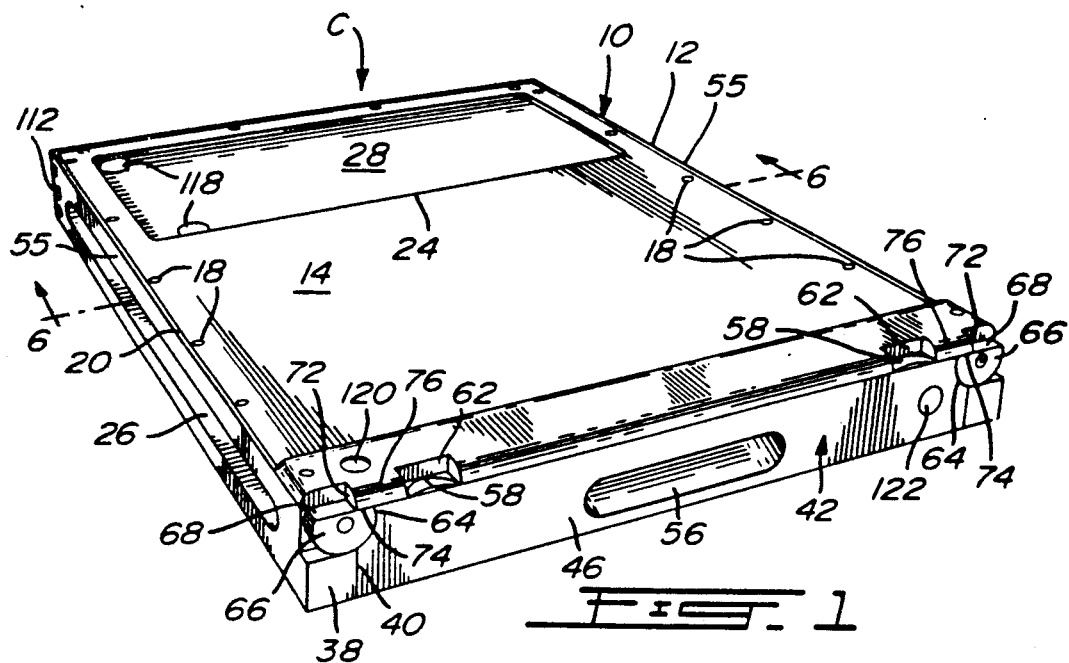
FIG. 1 is a perspective view of a motorized sheet film cartridge in accordance with the present invention.

Generally referring to FIGS. 1 and 2, the motorized sheet film cartridge C includes a plastic housing 10 formed by a rectangular peripheral frame 12 and by horizontal top and bottom walls 14 and 16, respectively. The frame 12 defines inwardly projecting upper and lower shoulders 15 and 15a on which the top and bottom walls 14 and 16 are respectively fixedly mounted by way of mounting screws 18, whereby the top and bottom walls 14 and 16 are flush with respective upper and lower peripheral edges 20 and 22 of the frame 12, as best seen in FIGS. 4 and 6.

The top wall 14 defines a rectangular opening 24 at a rear portion thereof which has dimensions larger than those of the sheet films (not shown) which the motorized sheet film cartridge C is intended to carry. The frame 12 defines reinforcement grooves 26 in the longitudinal sides thereof.

A horizontal sliding door 28 of dimensions which are larger than the opening 24 lies at its side edges on shoulders 30 defined inwardly in the frame 12. The door 28 is positioned directly under the top wall 14 and is in sliding contact therewith. A front support panel 32 is fixedly mounted at a front portion of the motorized sheet film cartridge C onto shoulders 34 in order to underlie the door 28 and to be positioned in front of the opening 24 of the top wall 14 in order not to obstruct the opening 28. Therefore, the door 28 is supported by the shoulders 30 and the front panel 32, with the top wall 14 overlying the door 28. The door 28 is thus slidable by means which will be described hereinbelow in horizontal longitudinal directions between open front (FIGS. 4 and 5) and closed rear (FIGS. 1 and 2) positions thereof, wherein, in the closed rear position, the door 28 closes the opening 24, as seen in FIG. 1. The door 28 defines on its underside a longitudinal reinforcement channel 36 (see FIG. 2) which prevents the door 28 from warping.

Referring to FIGS. 1, 6 and 7, a front section 38 of the frame 12 defines a large rectangular opening 40 for allowing a stainless steel tray 42 to be inserted longitudinally into the housing 10. The tray 42 which is not shown in FIGS. 2 to 5 for illustrative purposes includes a horizontal bottom 44 which extends longitudinally between a front portion 46 and a rear wall 48 of the tray 42 and which is supported by the bottom wall 16 of the housing 10. The tray 42 also has sides 50 which extend vertically upwards to the level of the front panel 32 and which are spaced apart substantially by the lateral transverse dimension of the sheet films which can thus be stacked therebetween and in abutment with the rear wall 48 of the tray 42.

Now referring to FIG. 6, the tray 42 is guided by way of longitudinal side tabs 52 which are projecting metal strips welded on the outer front surfaces of the sides 50 thereof and which are slidable in side guideways 54 defined longitudinally in the inner lower portions of the vertical longitudinal sides 55 of the frame 12. As seen in FIGS. 1 and 7, the front portion 46 of the tray 42 includes a central handle 56 and also top crescent-shaped recesses 58 which serve as thumb grips for removing the tray 42 from the housing 10 (as indicated by arrow 60 in FIG. 7) and which are accessible by corresponding indents 62 defined in the front portion of the top wall 14 of the housing 10.

The front portion 46 of the tray 42 further defines arcuate side recesses 64. A pair of locking knobs 66 rotatably mounted to the front section 38 of the frame 12 on each side of the tray 42 are shaped as a disk less a segment taken away therefrom to define a peripheral plane surface 68. The remaining peripheral surface of each knob 66, that is the arcuate surface thereof, defines a series of ribs 70 for gripping purposes. The curvature radii of the knobs 66 is slightly smaller than that of the recesses 64 whereby the knobs 66 can be rotated in and out of the recesses 64 respectively to lock the tray 42 to the housing 10 (see FIG. 1) and to allow the tray 42 to be inserted therein or removed therefrom, as seen in FIG. 7. The angular travel of the knobs 66 in each direction is limited by the plane surfaces 68 thereof abutting plane vertical and horizontal surfaces 72 and 74, respectively, which are defined by a pair of forward projections 76 extending from the front section 38.

In the housing 10, completely at the rear thereof, there is provided a drive mechanism for the door 28 which is generally indicated by the numeral 78 and which is illustrated in general in FIG. 2, with details thereof being shown in FIGS. 3 to 5.

Referring to FIG. 2, the drive mechanism 78 includes a reversible DC motor 80 provided with a reduction gear and mounted in the housing 10 by a motor clamp 82. The motor 80 includes a motor shaft 84 extending therefrom transversely in the housing 10. A door operating shaft 86 which extends parallel to the motor shaft 84 and across the housing 10 is journaled at both ends 88 thereof in the sidewalls 55 of the frame 12. A pair of coplanar drive gears 90 and 92 provided respectively on the motor shaft 84 and on the door operating shaft 86 are in meshed engagement, whereby actuation of the motor 80 causes the door operating shaft 86 to rotate.

A pair of chain drive gears 94 are mounted on the ends 88 of the door operating shaft 86 within cavities 95 formed in the sidewalls 55 of the frame 12, as best seen in FIGS. 2 to 4. Idler chain gears 96 are rotatably mounted to the sidewalls 55 of the frame 12 in cavities 97 formed in middle inner portions thereof, one such idler chain gear 96 being shown in FIG. 4. An endless chain 98 is engaged around each combination of a chain drive gear 94 and an idler chain gear 96, with each chain 98 extending through a pair of vertically spaced apart longitudinal and horizontal passages 100 defined in the sidewall 55 of the frame 12, as seen in FIG. 4. Two pins 102 which extend downwards from the front of the door 28 near each longitudinal side edges thereof each engage a respective chain 98 with the horizontal upper portion of the chain 98 being at least as long as the travel of the door 28.

Therefore, actuation of the motor 80 causes, as explained hereinabove, a rotation of the door operating shaft 86 and thus of the chain drive gears 94 and of the chains 98 which, by way of the pins 102, cause a horizontal and longitudinal translational displacement of the door 28. The door 28 is guided by the top wall 14 and the front panel 32 which prevent any vertical deviation of the door 28 and is laterally guided by the sidewalls 55 of the frame 12 at inner surfaces thereof delimiting the shoulders 30. For example, a rotation of the door operating shaft 86 in the direction indicated by arrow 104 in FIG. 2 will cause the door 28 to open, as shown by arrows 106.

The motor 80 is actuated by control signals transmitted by an external electronic source (not shown in FIGS. 1 to 7 but illustrated in the laser imaging apparatus of FIG. 8), such as a microcomputer. Such control signals are carried to the motor 80 by a pair of electrical contacts 108 and associated conducting wires 110, as generally shown in FIG. 2, with details thereof being illustrated in FIG. 3. Each electrical contact 108 has an external signal receiving surface 112 which is flush with the frame 12. Control signals are provided for both receiving surfaces 112 with the flow of the current indicating the direction of rotation of the DC motor 80 so as to either open or close the door 28.

As seen in FIG. 3, one of the ends 88 of the door operating shaft 86 defines a screwhead 114 and is accessible from outside of the motorized sheet film cartridge C to manually operate the door 28, when required.

The motor 80, the motor clamp 82, the motor shaft 84, the door operating shaft 86, the drive gears 90 and 92, the electrical contacts 108 and the conducting wires 110 are all encased in a protective plastic casing 116 of inverted "U" shape which is open at its bottom and mounted transversely at the rear of the housing 10 on the bottom wall 16 thereof, as seen in FIGS. 2 and 3. The rear wall 48 of the tray 42 abuts against a forwardmost vertical wall 117 of the casing 116 to limit the travel of the tray 42 when it is inserted in the housing 10.

The operation of the motorized sheet film cartridge C can be summarized as follows. An external electronic source is electrically connected to the receiving surfaces 112 of the electrical contacts 108 and can thus transmit a control signal to the electrical contacts 108 which actuate the motor 80 in the appropriate direction to cause the door 28 to open or close. When the door 28 is open, an external mechanism, an example of which is described hereinafter, can, through the opening 24, unload unexposed sheet film from the cartridge C in an order that it may be plotted, or load therein an exposed or plotted sheet film.

In apparatuses, such as laser imaging apparatuses and X-ray photographing devices, where it is necessary to prevent the sheet films from being exposed to light prior to their use, the cartridge C must provide a lightproof environment. Asides from the protection obtained by the lightproof housing 10, measures have also to be taken to ensure that the door 28 is only open when a sheet film is being inserted in the cartridge C or removed therefrom. For doing so, a pair of transversely offset reflectors 118 may be provided on the upper surface of the door 28, as seen in FIG. 1, in combination with a pair of infrared light beams (not shown) which emit towards the door 28 to sense the position thereof and ensure, by way of the external computer, a proper positioning of the door 28. The external computer can also sense the presence of the cartridge in the laser imaging or X-ray photographing apparatus.

In the application presented hereinbelow, two cartridges in accordance with the present invention are provided, one for unexposed films and the other for plotted films. As seen in FIG. 1, the cartridges C can be identified by different color cartridge status labels 120 and 122 positioned respectively on the housing 10 and on the tray 42 which, for instance, may be green for the unexposed film cartridge and red for the plotted film cartridge.

For each of the above two cartridges, it is necessary that the door 28 is closed when an extracted film is being exposed to radiation for protecting the remaining films from slow exposure to stray radiation.

To summarize the illustrated embodiment, the cartridge C, provides a portable and reusable lightproof container which includes a lockable tray or magazine for receiving a stack of loosely superimposed light sensitive sheet films which are one by one intended for exposure to radiation or have already been plotted thereby. The cartridge further includes an integrated, self contained drive mechanism and reflectors which provide for an externally computer-controlled opening and closing of the film access door, such as by a microcomputer, to allow the door to open and close for each removal or insertion of a sheet film from or in the magazine. The reflectors allow the computer to sense the position of the access door and ensure that the access door is closed except when a sheet film is being loaded therein or unloaded therefrom.

By using two cartridges to separate the films from each other, a large number of sheet films may be manually loaded in the tray of the unexposed film cartridge while allowing the exposed film cartridge to be removed and transported when desired, irrespective of whether or not it is full.

The prior art devices have closure members which cannot be replaced on the cartridge to prevent the remaining unexposed films from being exposed to light. Also, the sheet films have to be manually removed one by one from the tray and delivered to the recording section of the apparatus. Furthermore, the cartridge cannot be reused for unloading plotted films from the image recording apparatus. Moreover, the prior art devices do not provide for transport-ability of the exposed or unexposed films and lack the ability to receive control signals, such as by computer control, for automatically inserting the film in the cartridge and removing the same therefrom. Also, these known devices do not have the ability to sense the position of a displaceable door to ensure that the film is protected at all times from exposure except, obviously, when removing or inserting a sheet film.

Figure 8:
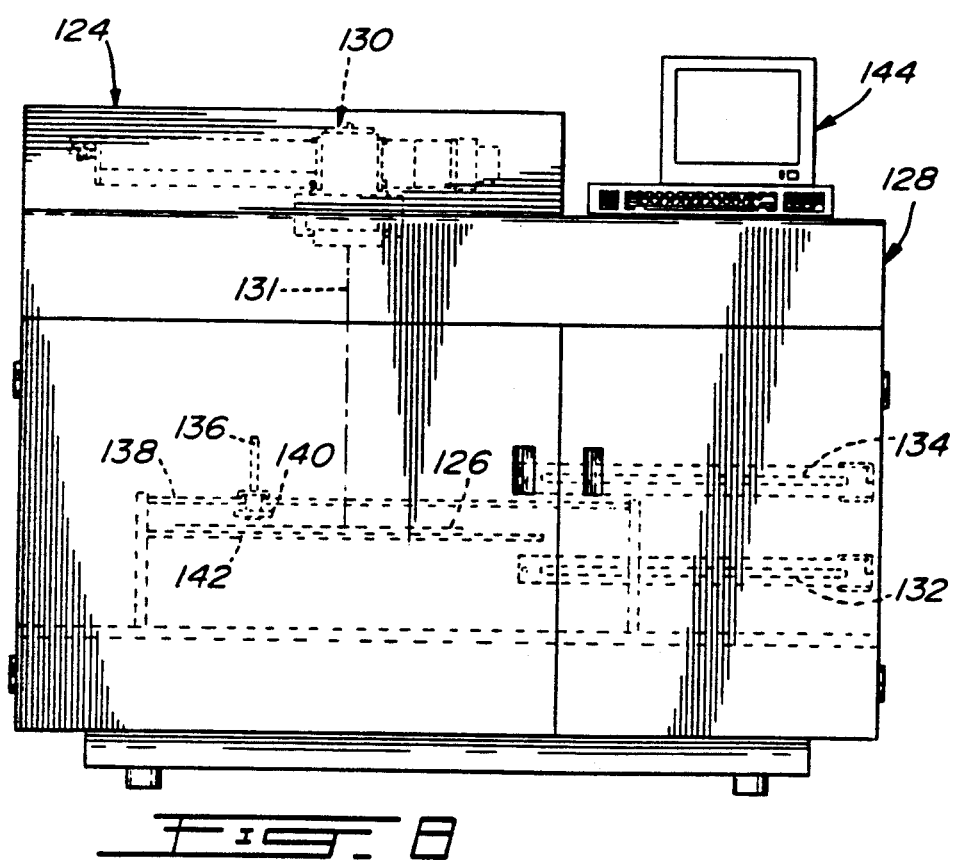
FIG. 8 is an elevation view of a laser imaging apparatus provided with a motorized sheet film cartridge in accordance with the present invention.

FIG. 8 illustrates how the motorized sheet film cartridge C of the present invention may be used in a laser imaging apparatus 124 for producing a two-dimensional image on a sheet film 126.

The laser imaging apparatus 124 comprises a housing 128 in which is arranged a laser scanning system 130 for scanning a laser beam 131 across the sheet film 126. The housing 128 further contains two motorized sheet film cartridges, that is an in-cartridge 132 and an out-cartridge 134, a film transport mechanism 136 (partially shown) moving along guide rails 138 (only one being shown) and including a suction disk 140, and a flat vacuum bed 142 mounted on a linear translation stage (not shown). The sheet film cartridges 132 and 134 are mounted on an elevator system (not shown) for vertical displacement; the in-cartridge 132 is used to load unexposed sheet films, whereas the out-cartridge 134 serves to unload the films after exposure. Both cartridges 132 and 134 are identical asides from their status labels which are respectively green and red colored as containing the exposed and unexposed films, respectively. The apparatus 124 is operated by means of a micro-computer 144.

When laser imaging is initiated, the in-cartridge 132 is moved into a position closely adjacent the flat vacuum bed 142. The micro-computer 144 then transmits a control signal which causes the door of the in-cartridge 132 to open, whereby the suction disk 140 can pick up a film 126 from the in-cartridge 132. The micro-computer 144 causes the door to close as soon as the film 126 has been removed from the in-cartridge 132. The suction disk 140 then positions the film 126 on the flat vacuum bed 142. The film 126 is thereafter scanned by the scanning beam 131. As the beam 131 moves across the film 126, it is modulated in response to an electrical signal which is fed to the scanning system 130 and which is representative of the desired image, thereby providing a first dimension of the image on the film 126. The flat vacuum bed 142 with the film 126 thereon is then moved by the linear translation stage and the film 126 is scanned again by the beam 131, thereby providing the other dimension of the desired two-dimensional image. This process is repeated until the complete image is scanned.

When imaging is complete, the out-cartridge 134 is moved into a position closely adjacent the flat vacuum bed 142, at which point the exposed film 126 is picked up from the flat vacuum bed 142 by the suction disk 140. The micro-computer 144 then causes the door of the out-cartridge 134 to open for allowing the suction disk 140 to insert the film 126 therein. The micro-computer 144 thereafter causes the door of the out-cartridge 134 to close. This sequence can be repeated automatically until the in-cartridge 132 requires a refill.

When the out-cartridge 134 containing the plotted films is removed from the laser imaging apparatus 124, it is inserted in a remote auto feeder (not shown), which is mounted on a film processor. The auto feeder feeds the exposed films from the out-cartridge 134 into the processor.

None of these operations require a darkroom as the laser imaging apparatus is itself lightproof.

We claim:

1. A motorized sheet film cartridge comprising a housing means for containing at least one sheet film, said housing means defining an opening, a film access door means and a door drive means for displacing said door means between an open position for allowing the sheet film to be removed from said housing means or inserted therein through said opening and a closed position wherein said door means closes said opening, said door drive means being adapted to be actuated by an external control means for selectively opening or closing said door means.

2. A motorized sheet film cartridge as defined in claim 1, wherein a magazine means is provided for containing a stack of sheet films, said magazine means being at least partially removable from said housing means for allowing the sheet films to be inserted therein or removed therefrom, whereby said cartridge is refillable.

3. A motorized sheet film cartridge as defined in claim 2, wherein said magazine means is slidable in said housing means between expanded and retracted positions thereof, said opening being defined in a top wall of said housing means, and wherein, in said retracted position, the sheet films are positioned under said opening for allowing in said open position of said door means the sheet films to be inserted in said cartridge or to be removed therefrom, said opening having transverse dimensions larger than those of each sheet film.

4. A motorized sheet film cartridge as defined in claim 3, wherein means are provided for securing said magazine means to said housing means in said retracted position.

5. A motorized sheet film cartridge as defined in claim 3, wherein said door means is horizontally slidable between said open and closed positions in a longitudinal direction, said door means being positioned between said top wall of said housing means and said magazine means.

6. A motorized sheet film cartridge as defined in claim 5, wherein said door drive means comprises a reversible motor means mounted in said housing means for rotatably driving a door operating shaft journaled in said housing means, door drive gear means being mounted to said door operating shaft and adapted for driving at least one push-pull elongated member, a connection means being provided between said door means and said elongated member, said elongated member being adapted to displace said connection means horizontally in said longitudinal direction a distance at least as great as a travel of said door means between said open and closed positions thereof.

7. A motorized sheet film cartridge as defined in claim 6, wherein said door operating shaft is manually operable from outside of said cartridge.

8. A motorized sheet film cartridge as defined in claim 6, wherein said push-pull elongated member comprises an endless chain, and wherein said connection means comprises a pin extending downwards from said door means and engaging a link of said chain.

9. A motorized sheet film cartridge as defined in claim 8, wherein one said chain is provided on each of two longitudinal sides of said door means with one of said pin engaging each said chain.

10. A motorized sheet film cartridge as defined in claim 6, wherein a casing is provided in said housing means over said motor means and said door operating shaft.

11. A motorized sheet film cartridge as defined in claim 6, wherein said motor means comprises electrical contact means adapted to be electrically connected to the external control means for transmitting control signals emitted thereby to said motor means, said motor means being adapted to be actuated in accordance with the control signals for driving said door means in an appropriate direction.

12. A motorized sheet film cartridge as defined in claim 11, wherein said motor means comprises a DC motor, a motor shaft driven thereby and a first drive gear mounted on said motor shaft and meshing with a second drive gear mounted on said door operating shaft.

13. A motorized sheet film cartridge as defined in claim 11, wherein the external control means includes a computer means, and wherein said door means is provided with a door position indicating means for allowing the computer means to sense a position of said door means to ensure that said door means is in said closed position except for when a sheet film is being unloaded from or loaded in said cartridge.

14. A motorized sheet film cartridge as defined in claim 13, wherein said door position indicating means comprises reflector means disposed on an upper surface of said door means, external means connected to the computer means emitting infrared light towards said reflector means for determining said position of said door means.

15. A motorized sheet film cartridge as defined in claim 2, wherein said cartridge is of modular contruction and is portable.

16. A motorized sheet film cartridge as defined in claim 15, wherein said housing means and said magazine means each comprises a cartridge status indicator means for indicating if said cartridge contains exposed or unexposed sheet films.

17. A motorized sheet film cartridge as defined in claim 1, wherein said housing means and said door means are made of a lightproof material.

18. A motorized sheet film cartridge as defined in claim 17, wherein said material is a plastics material.

* * * * *